Oct. 30, 1962  B. BARÉNYI  3,061,376
MOTOR VEHICLE CONSTRUCTION
Filed Oct. 10, 1958
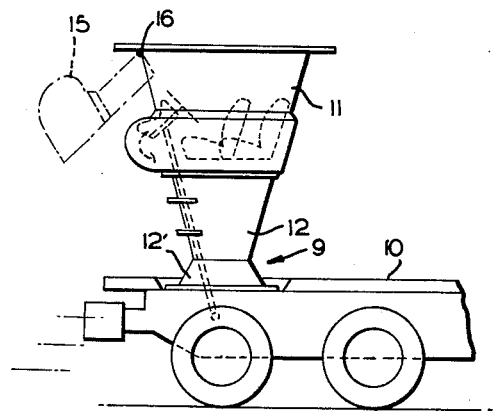
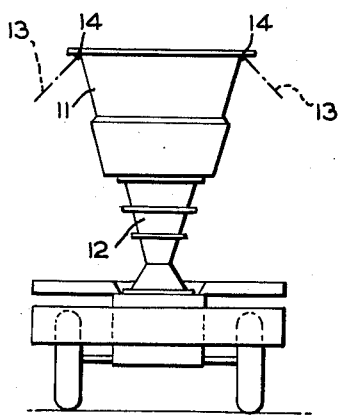
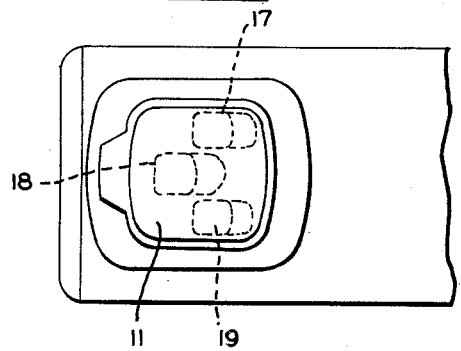
INVENTOR.
BÉLA BARÉNYI
BY Dicke and Craig
ATTORNEYS

United States Patent Office 3,061,376
Patented Oct. 30, 1962

3,061,376
MOTOR VEHICLE CONSTRUCTION
Béla Barényi, Stuttgart-Vaihingen, Germany, assignor to Daimler-Benz Aktiengesellschaft, Stuttgart-Unterturkheim, Germany
Filed Oct. 10, 1958, Ser. No. 766,517
Claims priority, application Germany Oct. 22, 1957
8 Claims. (Cl. 296—28)

The present invention relates to the construction and arrangement of the surfaces forming the passenger space of passenger motor vehicles or of the driver cabs of commercial-type motor vehicles such as trucks. Insofar as the present invention is applied to commercial-type motor vehicles such as trucks, it is concerned, in particular, with those vehicles offering a relatively large area or space for the pay-load, especially large-sized objects, and having the highest degree of efficiency as regards its traffic surface, and in which a relatively large loading surface serves for purposes of accommodating pay-loads which are of large area or of relatively great length. The driver cab or turret-like housing of such truck-type motor vehicles may thereby be arranged on a supporting column in order that only a slight amount of space is required from the loading surface for the supporting members of the driver cab.

The present invention consists essentially in that at least the upper part or top of the passenger space or of the driver cab of the motor vehicle becomes narrower or tapers in the direction from top to bottom, i.e., decreases in a downward direction insofar as the horizontal cross sectional area thereof is concerned.

In the motor vehicles known in the prior art, the upper part or top ordinarily tapers inwardly in the direction from bottom to top. Such a construction has certain disadvantages, among which, the following might be mentioned:

The end surfaces and lateral surfaces of the prior art top constructions which are normally inclined upwardly inwardly toward the center of the vehicle exhibit, inter alia, the disadvantage that other vehicles driving in the direction toward the vehicle may be blinded by the incident sunlight or other light rays falling thereon. Furthermore, the vision or sight of the driver and passenger is impaired more severely by a lateral surface inclined upwardly, inwardly in the manner known in the prior art if the same is constructed as window, when rain water, and especially when snow falls thereon, than with a window surface inclined upwardly, outwardly in the opposite direction in accordance with the present invention.

With a construction in accordance with the present invention, especially with such a construction of the driver housing or of the driver cab of a commercial type motor vehicle which becomes wider from bottom to top, i.e., the horizontal cross sectional area of which increases in the upward direction, good conditions as regards vision or sight of the passengers in a downward direction are always obtained irrespective of whether the driver cab is round, oblong or oval or has a plurality of corners.

The construction of the upper part or top of motor vehicles in accordance with the present invention may also be so made and arranged that only two surfaces of the top or upper part defining the passenger space of a passenger motor vehicle or the driver cab of a commercial type vehicle are inclined upwardly outwardly.

According to a further feature of the present invention, not only the upper part or top provided with transparent window surfaces or panes but also the lower part of the passenger space or of the driver cab of commercial type vehicles may be constructed so as to decrease from top to bottom. The surfaces, particularly the lateral surfaces, of an upper part or top according to the present invention and of the lower part adjoining the same may thereby consist of outer surfaces of parts of cones, the imaginary top or apices of which are disposed below the outer surfaces present in the vehicle and forming the outer walls thereof.

With an arrangement in which the surfaces, particularly the side surfaces of the upper part and of the lower part of the vehicle are inclined, these parts may then be disposed essentially in one plane and may pass over into each other or adjoin one another without any offset portion. The use of such a construction considerably simplifies the manufacture of a vehicle in accordance with the present invention.

The structural embodiments in accordance with the present invention as described hereinabove offer the further advantage that windshield wipers arranged along the lower edge of the windows with a tapering arcuate surface clean a relatively large surface area thereof.

With a construction of the upper part or top and also of the lower part in accordance with the present invention, it is further of advantage if at least one wall of the passenger space or of the driver cab, preferably the front or rear wall thereof, is pivotally connected within the region of the upper edge thereof so as to form a pivotal door-like member constituting a lid or cover for the driver cab to enable ingress and egress therefrom.

Furthermore, one or several windows, preferably the side windows, may be pivotally connected within the region of the upper edges thereof.

The pivotal connection of the door-like lid or cover member by means of a hinge or pivot axis located directly below the roof or along the upper edge of the driver cab of a truck-type vehicle offers the advantage that this pivotal door-like member, in order to enable the driver or the passengers to board the driver cab from below, only has to be pivoted through a relatively small angle in order to lay open or render free a sufficiently large boarding space or opening.

The pivotal movement of the lower edge of the windows and of the door-like member toward the outside of the vehicle in accordance with the present invention offers the further advantage with passenger motor vehicles as well as with commercial-type vehicles that the opened windows and/or the door-like boarding member keep away the rain and thereby act as an additional auxiliary roof portion.

According to a further improvement in accordance with the present invention, the side surfaces of the windows or of the door-like boarding member may be decreased in the downward direction to assume a trapezoidal contour. For purposes of manufacture and repairs, it is also of advantage if at least two diametrically opposite parts, for example, two windows or two door-like boarding members or lids are constructed identical and therewith interchangeable.

The ingress into or boarding of the driver cab of a truck or commercial-type motor vehicle may be facilitated with a three-seater arrangement in the driver cab and with the use of a door-like boarding member in accordance with the present invention in that the center seat forming the driver's seat is displaced forwardly in the direction toward the door-like member in relation to the other two seats disposed to the sides thereof.

With turret-like driver cabs, especially for commercial-type vehicles offering a large pay-load space and having the highest traffic surface efficiency, the present invention may also find useful application in the manner that the surfaces of the column carrying the driver cab, particularly the side surfaces thereof, are tapered inwardly essentially in extension of or in alignment with the surfaces of the upper part over the largest portion of the height thereof whereby the pedestal of the column adjoining the inwardly tapered portion is so constructed as to become larger again from the narrowest point thereof in the downward direction.

The roof of the passenger space or of the driver cab may extend at least along two edges thereof beyond the side surfaces of the upper part or top. By the use of such an extended roof, the driver cab as well as the upper part or top of the passenger space are advantageously covered and are furthermore protected in a far-reaching manner against the impinging rain normally falling thereon. With passenger motor vehicles utilizing such a construction of the roof, the additional advantage of a relatively large surface on the roof is thereby realized which is suitable for camping purposes, particularly for mounting thereon a tent.

Accordingly, it is an object of the present invention to provide an upper part or top for a motor vehicle including windows which assures good vision to the passengers at all times and under all weather conditions.

It is still another object of the present invention to provide a top or upper part for the passenger space of a motor vehicle, either of a passenger motor vehicle or a truck-type vehicle in which the side walls such as the window panes for the top of the passenger space are tapered or inclined upwardly outwardly so as to provide decreasingly smaller cross sections in horizontal planes from the top to the bottom thereof.

A still further object of the present invention resides in the provision and arrangement of the surface and walls for the upper part of a vehicle which minimizes the danger of blinding the drivers of other vehicles by the incident light rays falling thereon.

A still further object of the present invention resides in the provision of a construction of a top or upper part for the passenger space of a motor vehicle in which the transparent walls are so constructed as to assure good vision to the passengers toward the area disposed therebelow, i.e., in a downward direction.

A further object of the present invention resides in the provision of a top or upper part and of a lower part for the vehicle in which the surfaces thereof merge into one another without bends, set-off portions, etc., i.e., in which the various surfaces of the top and lower part of the vehicle pass over into one another in an essentially smooth manner to thereby simplify manufacture and assembly of the vehicles.

Another object of the present invention is the provision of a pivotal hinge arrangement for the windows which protect efficiently the passenger space against rain water, snow, et cetera, even when the windows are opened.

Still another object of the present invention resides in the provision of a pivotally arranged ingress or egress door-like lid or cover member which is so arranged as to necessitate a relatively small pivotal movement thereof to enable ready access to the passengers into the space.

These and other objects, features and advantages of the present invention will become more obvious from the following description when taken in connection with the accompanying drawing which shows, for purposes of illustration only, two embodiments in accordance with the present invention and wherein:

FIGURE 1 is a partial side view of the forward portion of a commercial type motor vehicle having a loading platform and provided with a driver cab in accordance with the present invention, FIGURE 2 is a front view of the motor vehicle illustrated in FIGURE 1, and FIGURE 3 is a plan view of the portion of the vehicle illustrated in FIGURE 1.

Referring now to the drawing, wherein like reference numerals are used throughout the various views to designate like parts, a commercial-type motor vehicle generally designated by reference numeral 9 has a relatively large dimension in the longitudinal direction and therewith offers a relatively large loading surface 10 which is particularly suited to transport relatively long pay-loads.

In order to require as little space as possible for the passenger cab 11 from the loading surface 10, the driver cab 11 is arranged very high above the loading surface 10 and is supported by a column 12. The driver cab 11 and the column 12 are so constructed that they are tapered downwardly, i.e., that the horizontal cross sections thereof decrease from top toward bottom. The foot portion or pedestal 12' of the column 12, however, is tapered so as to become larger in the direction from top to bottom in the embodiment illustrated herein. The lateral surfaces of the column 12 and of the driver cab 11 are disposed in essentially the same direction or plane and pass over into each other.

The windows 13 illustrated in FIGURE 2 may be opened by pivotal movement about the horizontally disposed pivot axes 14. The door-like boarding member 15 according to FIGURE 1 which forms a door-like lid or hood is also pivotally arranged about a horizontal pivot axis 16 in order to thereby render free or lay open the inlet aperture into the driver cab 11. As may be readily seen from FIGURE 1, the door-like member 15 only has to be swung or pivoted through a relatively small angle in order to render free or lay open a relatively large inlet opening. Furthermore, the door-like member 15 when opened acts additionally as a roof over that part of the vehicle provided with appropriate means, for example, steps or the like, which is used by the driver or passenger when boarding the driver cab 11. The steps may thereby be of any suitable construction, for example, of ladder-type construction or of elements secured to the vehicle body and column which permit ready accessibility into the driver cab 11 to the driver and passengers. Thus, in the opened condition shown in FIGURE 1 in dash lines, the door-like hood or lid 15 acts as an additional roof over that portion of the vehicle over which the driver or operator passes when mounting the driver cab 11.

FIGURE 3 shows a seating arrangement in the driver cab 11 in accordance with the present invention. Three seats, 17, 18 and 19 are provided in the driver cab 11 of which the center seat 18 serves as a driver seat. The driver seat 18 is displaced in the longitudinal direction of the vehicle with respect to the two lateral seats 17 and 19. By the use of the arrangement of the seats 17, 18 and 19 as illustrated in FIGURE 3, the boarding of cab 11 after opening the door-like member 15 is greatly facilitated.

The vehicle top part or upper part, as well as the vehicle lower part, may be of any suitable construction and material as is conventional, for example, sheet-metal or plastic material may be used for the lower part, while window panes together with plastic body material or metallic body parts may be used for the vehicle upper part. Furthermore, the window opening mechanisms for the pivotally arranged windows may be of any conventional type, for example, a crank-operated mechanism or electric motor operated worm gear drive. The door-like member 15 may be actuated in any suitable conventional manner which forms no part of the present invention.

While I have shown and described one embodiment in accordance with the present invention, it is understood that the same is not limited thereto but is susceptible of many changes and modifications within the spirit and scope of the present invention, and I, therefore, do not wish to be limited to the details shown herein for purposes of illustration only but intend to cover all such changes and modifications as encompassed by the appended claims.

I claim:

1. A passenger space construction for motor vehicles, such as passenger or commercial type motor vehicles which improves the vision for the driver and simplifies manufacture thereof, comprising an enclosed vehicle upper part and a vehicle lower part, said vehicle upper part having at least two upwardly outwardly inclined essentially flat wall means with glass surfaces and defining said passenger space, so that the cross-sectional area of said passenger space decreases in the horizontal plane in the direction from top to bottom of said passenger space, at least one of said wall means being pivotally hinged along the upper edge thereof and forming a door-like boarding member, and a seating arrangement including a central driver seat displaced in the longitudinal direction of the vehicle with respect to the passenger seats disposed to the sides thereof so as to facilitate boarding of said passenger space with said door-like member opened.

2. A passenger space construction for motor vehicles according to claim 1, wherein said driver seat is displaced in the direction toward said pivotally arranged door-like member.

3. A passenger space construction for motor vehicles, such as passenger or commercial type motor vehicles which improves the vision for the driver and simplifies manufacture thereof, comprising an enclosed vehicle upper part and a vehicle lower part, said vehicle upper part having at least two upwardly outwardly inclined essentially flat wall means with glass surfaces and defining said passenger space, so that the cross-sectional area of said passenger space decreases in the horizontal plane in the direction from top to bottom of said passenger space, said vehicle upper part further including a turret-like driver cab and column means for supporting said driver cab on said vehicle lower part, said vehicle lower part including a relatively large loading surface to transport large size objects and said column means being tapered inwardly in the direction from top to bottom.

4. A passenger space construction for motor vehicles according to claim 3, wherein at least one of said wall means of said vehicle upper part forms a door-like member and means for pivotally securing said door-like member along the upper edge thereof.

5. A passenger space construction for motor vehicles according to claim 4, wherein some other of said wall means form vehicle windows, and means for pivotally securing said windows along the upper edge thereof to enable said side windows to be pivoted outwardly from said passenger space.

6. A passenger space construction for motor vehicles according to claim 3, wherein at least some of said wall means form vehicle side windows, and means for pivotally securing said side windows along the upper edges thereof to enable said side windows to be pivoted outwardly from said passenger space.

7. A passenger space construction for motor vehicles according to claim 3, wherein said wall means are tapered in a trapezoidal manner in the downward direction thereof.

8. A passenger space construction for motor vehicles according to claim 3, wherein said column means further comprises pedestal means supporting thereon said column means and being tapered in the opposite direction from said column means.

References Cited in the file of this patent

UNITED STATES PATENTS

| | | |
|---|---|---|
| D. 151,580 | Ash | Nov. 2, 1948 |
| D. 173,733 | Juliano | Dec. 28, 1954 |
| D. 175,907 | Rahauser | Oct. 28, 1955 |
| D. 176,624 | McIntosh | Jan. 10, 1956 |
| D. 176,962 | Macauley | Feb. 21, 1956 |
| 185,623 | Burnham | Dec. 26, 1876 |
| 1,201,798 | Binder | Oct. 17, 1916 |
| 1,267,792 | Oliver | May 28, 1918 |
| 1,520,389 | Brewster | Dec. 23, 1924 |
| 1,629,439 | Dawson | May 17, 1927 |
| 1,633,635 | Harmon et al. | June 28, 1927 |
| 1,707,270 | Lichtenberg | Apr. 2, 1929 |
| 1,861,712 | Morrison | June 7, 1932 |
| 2,173,076 | Stetson | Sept. 12, 1939 |
| 2,486,734 | Campbell | Nov. 1, 1949 |
| 2,751,247 | Barenyi | June 19, 1956 |
| 2,815,243 | Campbell | Dec. 3, 1957 |
| 2,822,055 | Ludowici | Feb. 4, 1958 |

FOREIGN PATENTS

| | | |
|---|---|---|
| 105,341 | Australia | Sept. 28, 1938 |
| 1,010,391 | Germany | June 13, 1957 |
| 321,242 | Italy | Sept. 28, 1934 |